United States Patent [19]
Bland et al.

[11] Patent Number: 5,218,007
[45] Date of Patent: * Jun. 8, 1993

[54] POLY(ARYL ETHER) FOAM PRODUCED WITH AQUEOUS BLOWING AGENT

[75] Inventors: David G. Bland, Knoxville, Tenn.; Joseph J. Conte, Newark, Ohio

[73] Assignee: The Dow Chemical Company, Midland, Mich.

[*] Notice: The portion of the term of this patent subsequent to May 21, 2008 has been disclaimed.

[21] Appl. No.: 685,302

[22] Filed: Apr. 12, 1991

[51] Int. Cl.$^5$ .............................. C08J 9/12; C08J 9/08
[52] U.S. Cl. ........................................ 521/79; 521/81; 521/82; 521/94; 521/97; 521/98; 521/180; 521/134; 521/189
[58] Field of Search ....................... 521/79, 82, 97, 94, 521/180, 81, 134

[56] References Cited

U.S. PATENT DOCUMENTS

| | | |
|---|---|---|
| 3,894,974 | 7/1975 | Hunter et al. . |
| 3,946,064 | 3/1976 | Hunter et al. . |
| 4,105,601 | 8/1978 | Hunter et al. . |
| 4,169,954 | 10/1979 | Hunter et al. . |
| 4,919,992 | 4/1990 | Blundell et al. . |
| 4,940,733 | 7/1990 | Kuphal et al. . |
| 5,017,622 | 5/1991 | Bland et al. ............ 521/79 |

Primary Examiner—Morton Foelak

[57] ABSTRACT

The present invention is directed to foams produced from poly(aryl ethers) and mixtures of poly(aryl ethers) with various non-poly(aryl ether) polymers. These foams are produced using aqueous blowing agents comprising water as the only blowing agent, or mixtures of water with another blowing agent material.

26 Claims, No Drawings

POLY(ARYL ETHER) FOAM PRODUCED WITH AQUEOUS BLOWING AGENT

BACKGROUND OF THE INVENTION

1. Field of the Invention

This invention relates to poly(aryl ether) foams, and to processes for the production thereof. More particularly, this invention relates to processes which employ aqueous pristine blowing agents for the production of poly(aryl ether) foams, and the foams produced thereby.

2. Description of Related Art

U.S. Pat. No. 4,940,733 relates to the use of poly(alkylene carbonates) as foaming agents for foaming poly(aryl ethers) including modified poly(phenylene ethers). U.S. Pat. No. 4,837,251 relates to the use of a blowing agent such as boric acid to foam compositions which may comprise poly(aryl ethers). U.S. Pat. No. 4,919,992 relates to a process of converting semicrystalline polymers such as poly(aryl ethers) into novel physical forms with open cell, porous characteristics. U.S. Pat. Nos. 3,894,974 and 3,946,064 relate to the use of hydrazodicarboxylates as chemical blowing agents for poly(aryl ethers). U.S. Pat. Nos. 4,105,601 and 4,169,954 disclose the use of 3,3'-carbonylbis(organo carbazates) as blowing agents for poly(aryl ethers).

Although it would be highly desirable to produce foams from high melt temperature engineering thermoplastics such as poly(aryl ethers), it appears that prior art efforts to produce such foams have employed chemical blowing agents. These foams would be very useful for many purposes, such as structural applications, and as components of high temperature foam compositions. It would be highly desirable to be able to produce foams from poly(aryl ethers) with cheap physical blowing agents.

Recent advances in the foam art have emphasized environmental considerations related to the use of blowing agents. Of particular concern has been the use of halogenated blowing agents and their potential environmental impact. Therefore, it would be desirable to be able to produce poly(aryl ether) foams by a process which employs aqueous blowing agents.

SUMMARY OF THE INVENTION

The instant invention relates to a process for the production of poly(aryl ether) foam comprising forming a flowable gel under conditions of sufficient heat and pressure for the gel to form from a gel forming mixture comprising at least one poly(aryl ether) and a blowing agent comprising water and releasing the pressure to convert the flowable gel into a cellular mass.

In another embodiment the instant invention comprises a process for the production of poly(aryl ether) foam comprising forming a flowable gel under conditions of sufficient heat and pressure for the gel to form from a gel forming mixture comprising at least one poly(aryl ether) and a blowing agent mixture comprising water as a first blowing agent and at least a second blowing agent, and releasing the pressure to convert the flowable gel into a cellular mass.

Further embodiments of the instant invention include the foams produced by the aforementioned processes.

DESCRIPTION OF THE PREFERRED EMBODIMENTS

The poly(aryl ethers) which are useful in the processes of this invention for the production of the poly(aryl ether) foams of this invention preferably contain repeating units which can be represented by the formula:

where Ar is an aromatic diradical which comprises one or more $C_6$ to $C_{20}$ arylene groups and Y is divalent oxygen or divalent sulfur. The term "poly(aryl ether)" refers to a polymer which comprises primarily the repeating units described above. The term "ether" as used herein refers to both oxygen containing ethers and sulfur containing thioethers.

The production of poly(aryl ethers) is well known and is described in numerous references. U.S. Pat. No. 4,175,175 describes polyarylene polyethers that are linear thermoplastic reaction products of an alkali metal double salt of a dihydric phenol and a dihalobenzenoid compound. These polymers are characterized by high molecular weights and by high melt viscosities. Related polyarylene polyethers are described in U.S. Pat. Nos. 4,777,235 and 4,783,520. U.S. Pat. Nos. 4,051,109 and 4,232,142 relate to the production of polyarylene ether sulfones and ketones through the use of salts of various precursors. U.S. Pat. Nos. 4,065,437 and 3,832,331 relate to aromatic polyether-sulfones. Other related art in this field is found in U.S. Pat. Nos. 4,036,815, 4,113,699, 3,418,277, 4,056,511, 4,400,499, 3,446,654, Re. 28,252, and 4,711,945. There are numerous examples in the art of the preparation of poly(aryl ethers) and related polymers, usually with the aid of a polymerization catalyst such as an alkali metal halide or carbonate, including U.S. Pat. Nos. 3,441,538, 3,941,748, 4,169,178, 4,320,224, 4,638,044, 4,687,833, 4,731,429, 4,748,227, and 4,767,838. In U.S. Pat. No. 4,360,630, this type of polymer was used to prepare composites. The teachings of these U.S. Patents are hereby incorporated by reference.

EP No. 317,226 discloses macrocyclic compounds, including cyclic ethers, containing polyarylene units and other cyclic units. WO 88/06605 discloses random macrocyclic monomer and oligomer compounds containing a spiro(bis)indane moiety.

An important new method for the production of poly(aryl ethers) from cyclic poly(aryl ether) oligomers is disclosed in copending commonly-assigned U.S. patent application Ser. No. 07/547,658, filed Jul. 3, 1990.

A particular class of poly(aryl ethers) that is preferred is the poly(phenylene oxide)s (PPO)'s. See "Aromatic Polyethers", pages 594 to 615 in Vol. 18, "Encyclopedia of Chemical Technology", ed Kirk-Othmer, third edition, John Wiley & Sons, 1982. Particularly useful members of the class include:
poly(1,4-phenylene oxide)
poly(2,6-dimethyl-1,4-phenylene oxide)
poly(2-phenyl-6-methyl-1,4-phenylene oxide)
poly(2-benzyl-6-methyl-1,4-phenylene oxide)
poly(2-isopropyl-6-methyl-1,4-phenylene oxide)
poly(2,6-dimethoxy-1,4-phenylene oxide)
poly(2,6-dichloro-1,4-phenylene oxide)
poly(2,6-diphenyl-1,4-phenylene oxide)
poly(2-m-tolyl-6-phenyl-1,4-phenylene oxide)
poly(2-p-tolyl-6-phenyl-1,4-phenylene oxide)

poly(2-(4-t-butyl)phenyl-6-phenyl-1,4-phenylene oxide)
poly(2-a-naphthyl-6-phenyl-1,4-phenylene oxide)
Related to this class of poly(aryl ethers) is the modified poly(phenylene oxide)s which are blends of one or more poly(phenylene oxide) polymers with a non-poly(phenylene oxide) polymer such as styrene.

In addition to the modified PPO's there is a wide range of polymer blends suitable for utilization in the practice of the instant invention. Poly(aryl ether) blends with sulfone polymers for use in the production of foams is the subject of copending U.S. patent application Ser. No. 598,265 filed Oct. 16, 1990, U.S. Pat. No. 5,017,622 which is hereby incorporated by reference. Other suitable blends include at least one poly(aryl ether) with at least one other polymer such as styrene, styrene/alpha-methylstyrene, polyetherimide, polycarbonate, nylon, polyphenylene oxide, polyester terephthalate, polypropylene and polyethylene.

The poly(aryl ether) foams of the present invention can be produced in a conventional manner by forming a flowable gel under conditions of sufficient heat and pressure for the gel to form from a gel forming mixture comprising one or more poly(aryl ethers) and a blowing agent comprising water, and then releasing the pressure to convert the flowable gel into a cellular mass. Desirably water used as a blowing agent is present in the gel forming mixture in a concentration from about 1 pph to about 300 pph (parts per hundred by weight based on the weight of polymer), and preferably from about 2 pph to about 25 pph, and more preferably from about 2 pph to about 10 pph.

As is well known in the art, it may be advantageous to add small amounts of various additives for certain purposes either to the polymeric material initially upon its introduction into the processing equipment, or to the gel forming mixture during its preparation. Among the nucleating agents useful in the present invention for the control of the cell size are talc, clay, mica, silica, titanium dioxide, zinc oxide, calcium silicate, metallic salts of fatty acids such as barium stearate, zinc stearate, aluminum stearate, and the like. One or more of these nucleating agents may be present as a finely divided solid in an amount from about 0.01 pph to about 10 pph. Preferred nucleating agents have a number average particle size from 1 nm to $10^3$ nm. It has been found that nucleating agents are important for the production of uniform small cell size in the foams of the present invention.

It is to be expected that drying the polymer to be used in the foam producing process simplifies handling and transport of the material before the formation of the gel forming mixture, where water is again introduced. A mixing agent may be used with beneficial results for the mixing and handling of the materials up to the point of expansion of the flowable gel.

In another embodiment of the present invention a blowing agent mixture is employed which comprises water and at least a second blowing agent, which is a normally gaseous material or an organic liquid. For all blowing agent mixtures which contain an organic liquid water is the major component by weight. Preferred are blowing agent mixtures with from 51 to 100 percent water, while more preferred are blowing agent mixtures with from 70 to 100 percent water, and most preferred are blowing agent mixtures with from 90 to 100 percent water.

Normally gaseous materials useful in the aqueous blowing agent mixtures of the present invention include atomic gases such as helium, neon and argon, as well as simple molecular gases such as carbon dioxide, nitrogen, oxygen and simple molecular organic molecules such as low molecular weight hydrocarbons, and mixtures thereof, such as air and natural gas.

All of the aforementioned materials are intended to be embraced within the term "normally gaseous material" as used herein. This term is intended to mean that the expanding material employed is a gas at the temperatures existing under the normal operating conditions of a plastic extruder. Also, when reference is made to the introduction of a normally gaseous material or a gas into a plastic compound in an extrusion cylinder, it is to be understood that, while the material introduced is a gas at the normal operating temperature of the extruder, it may be in either the gaseous or the liquid state at the temperature and pressure at which it is introduced into the extrusion cylinder. In fact, it is advantageous to employ blowing agents which are liquids when introduced into the extrusion cylinder because it is easier to pump a liquid under constant pressure and volume than it is to supply a gas under constant pressure and volume.

Examples of liquids which may be used as blowing agents in the aqueous blowing agent mixtures of the present invention include hydrocarbons, such as pentane, hexane, heptane, octane; unsaturated hydrocarbons, such as pentene, 4-methyl pentene, hexene; petroleum ester fractions: ethers such as dethyl ester: ketones such as acetone or methyl ethyl ketone; and alcohols such as methanol or ethanol.

In practice, the cellular poly(aryl ether) bodies of the invention can be prepared by placing the molten polymer under pressure into contact with the blowing agent or blowing agent mixture and any other additives, such as by heating the materials in admixture with one another in a pressure-resistant vessel, such as, for example, an extruder, at temperatures between about 200° C. and about 400° C., suitably at a temperature at least as high as the melting point of the polymer, until a uniform or substantially uniform flowable gel is obtained. Pressures employed are in the range from about 1 atm to about 500 atm. Thereafter, the gel is extruded into a zone of sufficiently lower pressure to cause the extruded material to expand with the resultant formation of a cellular polymer mass. The process can be carried out batchwise or in a continuous manner.

The gel is preferably extruded at a temperature near or above the melting point of the sulfone polymer, but higher or lower temperatures can be used. The temperature at which the gel is extruded into a zone of lower pressure will vary depending in part upon the size and arrangement of the apparatus employed, the rate of extrusion of the gel, the melting point of the sulfone polymer and the proportions of the polymer and the blowing agent employed.

In a preferred practice for making cellular poly(aryl ether) body in a continuous manner, the normally solid polymer, e.g., poly(aryl ether) or a blend comprising poly(aryl ether) as hereinbefore described, suitably in dried granular form, would be fed to a plastic extruder. Therein it is heat-plastified and blended with the blowing agent under pressure in the desired proportion to form a homogeneous flowable gel. The gel is then brought to a substantially uniform temperature normally between about 200° and 400° C. throughout its mass and is thereafter extruded and discharged through a suitable orifice into a zone of lower pressure, usually the pressure of the atmosphere. The extruded material expands to form a cellular body which is cooled and cut into pieces suitable for convenient handling. In other embodiments the zone of lower pressure into which the foam forming flowable gel is allowed to expand is maintained at a pressure other than ambient pressure in the range from about 0.1 atm to about 10 atm.

The invention provides an improved and economical method for making cellular masses from poly(aryl ether) polymers, which cellular material is useful for a variety of purposes, e.g., as insulation, and in high temperature structural applications. The products possess a highly uniform fine-cell structure having either predominantly open or closed cell structure, consisting for the most part of thin-walled individual cells. The products are flexible and tough. Preferred are predominantly closed cell foams containing from 80 to 100 percent closed cell structures.

In the following examples, all parts and percentages are on a weight basis based on the weight of the polymer or mixture of polymers unless otherwise indicated. These examples are presented as being merely illustrative and should be understood to have no limiting effect on the scope of the present invention.

EXAMPLES

Example 1

A weighed sample of poly(phenylene oxide) (PPO) available from GE Plastics, PPO Technology Department, Selkirk, N.Y., was placed in a glass ampule to which a measured amount of blowing agent was added. The ampoule was then sealed off by heating with a torch. The ampoule was placed in an explosion proof tube, which was then heated in an oven for 1.5–2 hours at 250° C. and then for 1–2 hour at 225° C. For one run the ampoule was then heated additionally at 200° C. for one half hour. The final temperature was stabilized and is the foaming temperature. Foaming was initiated by the transmission of a mechanical shock to the ampoule. For some runs this resulted in fracture of the glass ampoule. Runs were made with 200 pph water as the blowing agent, all of which resulted in the production of some foam. It was clear that longer heating times resulted in more complete melting of the PPO and better mixing with the water blowing agent, and that this resulted in better foam. Not all the water blowing agent was soluble and therefore, not all of it was consumed. However, it was estimated that about 15 to 20 pph water was adequate for good foaming.

Example 2

The method of Example 1 was used with various blends of polyethersulfone (PES) available from BASF Corp., Plastic Materials, Parsippany, N.J., mixed with polyphenylene oxide (PPO). A blend of PES/PPO in a ratio by weight of 1/1 processed as described above produced a foam. However, a similar 1/1 sample and a PES/PPO sample in a ratio of 9/1 which were heated and blended at a temperature of from 270° C. to 300° C. produced excellent foam.

What is claimed is:

1. A process for the production of poly(aryl ether) foam comprising forming a flowable gel under conditions of sufficient heat and pressure for the gel to form from a gel forming mixture comprising at least one poly(aryl ether) and a blowing agent comprising water and releasing the pressure to convert the flowable gel into a cellular mass.

2. The process of claim 1 wherein the gel forming mixture comprises at least one poly(aryl ether), a blowing agent comprising water and a nucleating agent.

3. The process of claim 2 wherein the gel forming mixture comprises at least one poly(aryl ether), a blowing agent comprising water, a nucleating agent and a mixing agent.

4. The process of claim 1 wherein the gel forming mixture comprises a blend of at least two poly(aryl ethers).

5. The process of claim 1 wherein the gel forming mixture comprises a blend of at least one poly(aryl ether) and at least one non-poly(aryl ether)

6. The process of claim 1 wherein the blowing agent is water present in an amount from about 1 pph to about 300 pph, where pph are parts per hundred by weight based on the weight of polymer.

7. The process of claim 6 wherein the blowing agent is water present in an amount from about 2 pph to about 25 pph.

8. The process of claim 7 wherein the blowing agent is water present in an amount from about 2 pph to about 25 pph.

9. The process of claim 1 wherein the at least one poly(aryl ether) is a polyphenylene oxide polymer.

10. The process of claim 1 wherein the at least one poly(aryl ether) is a poly(2,6-dimethyl-1,4-phenylene oxide) polymer.

11. The process of claim 1 wherein the at least one poly(aryl ether) is a poly(2,6-diphenyl-1,4-phenylene oxide) polymer.

12. A process for the production of poly(aryl ether) foam comprising forming a flowable gel under conditions of sufficient heat and pressure for the gel to form from a gel forming mixture comprising at least one poly(aryl ether) and a blowing agent mixture comprising water as a first blowing agent and at least a second blowing agent, and releasing the pressure to convert the flowable gel into a cellular mass.

13. The process of claim 12 wherein the gel forming mixture comprises at least one poly(aryl ether), a blowing agent mixture comprising water and at least a second blowing agent, and a nucleating agent.

14. The process of claim 13 wherein the gel forming mixture comprises at least one poly(aryl ether), a blowing agent mixture comprising water and at least a second blowing agent, a nucleating agent and a mixing agent.

15. The process of claim 12 wherein the gel forming mixture comprises a blend of at least two poly(aryl ethers).

16. The process of claim 12 wherein the gel forming mixture comprises a blend of at least one poly(aryl ether) and at least one non-poly(aryl ether) polymer.

17. The process of claim 12 wherein the blowing agent mixture is present in an amount from about 1 pph to about 300 pph, where pph are parts per hundred by weight based on the weight of polymer.

18. The process of claim 17 wherein the blowing agent mixture is present in an amount from about 2 pph to about 25 pph.

19. The process of claim 18 wherein the blowing agent mixture is present in an amount from about 2 pph to about 25 pph.

20. The process of claim 12 wherein the blowing agent mixture comprises water and carbon dioxide as a second blowing agent.

21. The process of claim 20 wherein the blowing agent mixture contains water from about 1 pph to about 10 pph and carbon dioxide from about 1 pph to about 10 pph.

22. The process of claim 20 wherein the ratio of water to carbon dioxide is from about 10:1 to about 1:10.

23. The process of claim 12 wherein the blowing agent mixture comprises water and nitrogen as a second blowing agent.

24. The process of claim 23 wherein the blowing agent mixture contains water from about 1 pph to about 10 pph and nitrogen from about 1 pph to about 10 pph.

25. The process of claim 23 wherein the ratio of water to nitrogen is from about 10:1 to about 1:10.

26. The process of claim 12 wherein the blowing agent mixture comprises water as a first blowing agent, carbon dioxide as a second blowing agent and nitrogen as a third blowing agent.

* * * * *